United States Patent
Bhosle et al.

(10) Patent No.: US 11,526,365 B2
(45) Date of Patent: Dec. 13, 2022

(54) UNIFIED WAY TO TRACK USER CONFIGURATION ON A LIVE SYSTEM

(71) Applicant: VMware, Inc., Palo Alto, CA (US)

(72) Inventors: Mayur Bhosle, San Jose, CA (US); Mukund Gunti, Sunnyvale, CA (US); Olivier Alain Cremel, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 51 days.

(21) Appl. No.: 17/156,487

(22) Filed: Jan. 22, 2021

(65) Prior Publication Data

US 2022/0236999 A1 Jul. 28, 2022

(51) Int. Cl.
*G06F 9/445* (2018.01)
*G06F 9/455* (2018.01)
*G06F 9/4401* (2018.01)

(52) U.S. Cl.
CPC ...... *G06F 9/44505* (2013.01); *G06F 9/45533* (2013.01); *G06F 9/4401* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 11,080,065 B1* | 8/2021 | Reshadi | ................ H04L 67/564 |
| 2021/0311755 A1 | 10/2021 | Bhosle et al. | |
| 2021/0311756 A1 | 10/2021 | Bhosle | |
| 2022/0141085 A1* | 5/2022 | Singhal | .................. H04L 41/40 709/221 |

* cited by examiner

*Primary Examiner* — Charlie Sun
(74) *Attorney, Agent, or Firm* — Kim & Stewart LLP

(57) ABSTRACT

A method of remediating configurations of a plurality of system services running in each of a plurality of hosts, wherein each of the hosts is configured with a virtualization software for supporting execution of virtual machines therein, includes the steps of: retrieving actual configurations of the system services, wherein the actual configurations are stored in accordance with a configuration schema of the system services and include a user configuration, which is a configuration initiated by the user, and a system configuration, which is a configuration initiated by the host in response to the user configuration; retrieving desired configurations of the system services from a desired configuration file; comparing each of the actual configurations with a corresponding one of the desired configurations; and upon determining that at least one actual configuration, which is not a system configuration, is different from a corresponding one of the desired configurations, replacing the at least one actual configuration with the corresponding desired configuration.

20 Claims, 15 Drawing Sheets

BEFORE

{
　"key": "ssh",
　"group": "system",
　"component": "esx",
　"enable": {
　　"config": true,
　　"defaultvalue": false,
　　"type": Boolean
　}
} — 1010

{
　"key": "firewall",
　"group": "system",
　"component": "esx",
　"enable": {
　　"config": true,
　　"defaultvalue": false,
　　"type": Boolean
　}
} — 1014

| Key | Value |
|---|---|
| ssh | {enable:false, type:user} |
| firewall | {enable:false, type:user} |

AFTER

{
　"key": "ssh",
　"group": "system",
　"component": "esx",
　"enable": {
　　"config": true,
　　"defaultvalue": true,
　　"type": Boolean
　}
} — 1012

{
　"key": "firewall",
　"group": "system",
　"component": "esx",
　"enable": {
　　"config": true,
　　"defaultvalue": false,
　　"type": Boolean
　}
} — 1016

| Key | Value |
|---|---|
| ssh | {enable:true, type:user} |
| firewall | {enable:true, type:system} |

FIGURE 10

UNIFIED WAY TO TRACK USER CONFIGURATION ON A LIVE SYSTEM

BACKGROUND

A typical software stack for configuration management of a system includes an application programming interface (API) layer, which provides an endpoint to configure and monitor the system, a business logic layer, which contains the API implementation, and a persistence layer, which persists any configuration or state changes in the system onto a disk. In the typical system, configuration actions performed by an end user are not persisted while the system is live. It is thus impossible to determine the configuration tasks previously performed by the user, especially after a long period of time has passed since boot-up of the system. Rather, only the resulting state of those tasks is persisted. The system can thus only report the current configuration state, and it is impossible to revert to a certain configuration state. In fact, it is difficult to even revert to the initial default configuration state.

The inability to determine the configuration tasks previously performed is especially problematic if the user must manage the system at a large scale. As the number of configurations that must be set and monitored increases, the complexity of managing the system grows. Only ad hoc solutions are available, and such solutions only provide configuration and compliance support for a limited set of configurations.

As disclosed in U.S. patent application Ser. No. 16/837,676, filed Apr. 1, 2020, the entire contents of which are incorporated by reference herein, a system may be implemented that defines which properties need to be persisted upfront in a configuration schema. The configuration schema may define such properties as either configurations or states. A configuration is data that the user provides as part of a configuration action. A state is data that the system generates internally, the state being further classified as either vital or cached. The system persists configurations and vital states across reboots but does not persist cached states.

By defining properties using configuration schemas, configuration actions can be tracked by storing updates to configurations in a database. As a result, configuration changes can be easily detected while the system is live. However, the system may include many services, including network time protocol (NTP) service, secure shell (SSH) service, authentication service, firewall service, network service, storage service, keyboard service, etc. It is still burdensome for the user to manage the configurations for all these different services separately.

Additionally, some configuration changes are initiated by the user, referred to herein as "user configurations," while other configuration changes are initiated by the system in response to the user configurations, referred to herein as "system configurations." If the system does not distinguish between user and system configurations, then the system will not be able to remediate the system's current state to a desired state specified by the user. Instead, the system will treat system configurations as deviations from the desired state. The system may then attempt to remediate the current state to the desired state in undesired ways such as by, e.g., deleting system configurations.

Furthermore, it may not be possible to define configuration schemas for all system services. There may be some system services that were created too far in the past or open-sourced, that there may be no set of developers who understand the design of the system service well enough to define a configuration schema for it. These system services, however, cannot be ignored and need to be accounted for when transitioning legacy systems that rely on them to a desired state model for system services.

SUMMARY

Accordingly, one or more embodiments provide techniques to distinguish between user configurations and system configurations, and to retain configuration files of legacy system services so that all system services can execute properly in hosts that are being upgraded to a desired state model for system services.

One embodiment is directed to a method of remediating configurations of a plurality of system services running in each of a plurality of hosts, wherein each of the hosts is configured with a virtualization software for supporting execution of virtual machines therein. The method includes the steps of: retrieving actual configurations of the system services, wherein the actual configurations are stored in accordance with a configuration schema of the system services and include a user configuration, which is a configuration initiated by the user, and a system configuration, which is a configuration initiated by the host in response to the user configuration; retrieving desired configurations of the system services from a desired configuration file; comparing each of the actual configurations with a corresponding one of the desired configurations; and upon determining that at least one actual configuration, which is not a system configuration, is different from a corresponding one of the desired configurations, replacing the at least one actual configuration with the corresponding desired configuration.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 10 is an example of a desired configuration JSON file and key-value store before and after a user configuration action.

DETAILED DESCRIPTION

Figure 1:
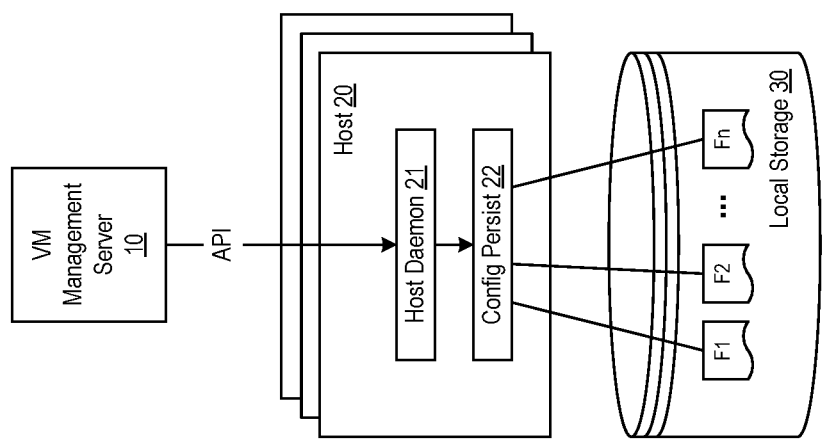
FIG. 1 is a block diagram of a virtualized computing system of the prior art in which configurations are persisted in files that are stored in local storage units.

FIG. 1 is a simplified block diagram of a virtualized computing system of the prior art in which configurations are persisted in files that are stored in local storage units 30. The virtualized computing system of FIG. 1 includes a virtual machine (VM) management server 10 that manages the lifecycle of VMs running in a cluster of hosts 20. To configure system services running in hosts 20, an end user operates a user interface (UI) (not shown) on VM management server 10 to make configuration API calls to hosts 20. A host daemon 21 running in each host 20 receives and processes these API calls. If an API call requires the virtualized computing system to set a configuration for a particular system service, host daemon 21 instructs a configuration persistence layer 22 in host 20 to persist the configuration in a local storage unit 30. The configuration is stored as a file in local storage unit 30 corresponding to the system service (i.e., file F1, file F2, . . . , file Fn). For example, if the configuration for the system service is persisted in file F1, then the next time a host 20 executes the system service, host 20 executes the system service with the configuration stored in file F1.

Figure 2:
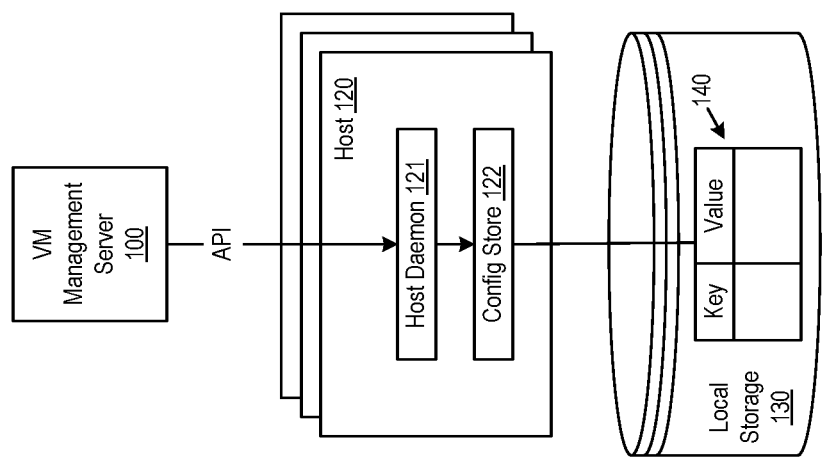
FIG. 2 is a block diagram of a virtualized computing system in which configurations are persisted in key-value stores provisioned in local storage units.

FIG. 2 is a simplified block diagram of a virtualized computing system in which configurations are persisted in key-value stores 140 provisioned in local storage units 130. The virtualized computing system of FIG. 2 includes a VM management server 100 that manages the lifecycle of VMs running in a cluster of hosts 120. To configure system services running in hosts 120, an end user operates a UI (not shown) on VM management server 100 to make configuration API calls to hosts 120. A host daemon 121 running in each host 120 receives these API calls and passes them to a configuration store 122 for processing. Configuration store 122 exposes configurations for different system services as configuration objects, each configuration object being backed by a corresponding configuration schema. Configuration store 122 records all updates to the configurations of system services in key-value store 140. In key-value store 140, a "key" corresponds to a system service, and a corresponding "value" for the key stores one or more configuration properties and one or more internal states for that system service.

Figure 3:
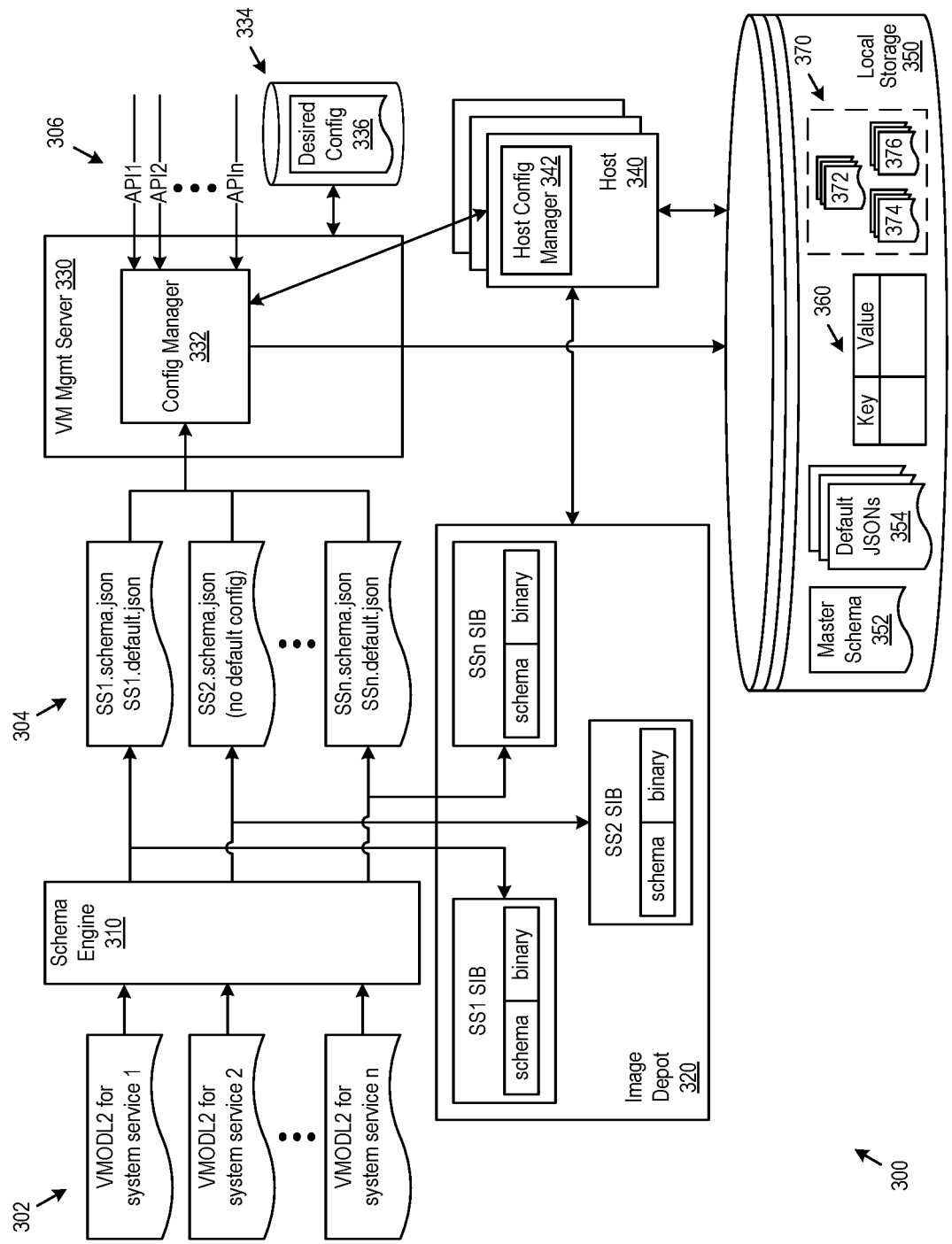
FIG. 3 is a block diagram of a computing system in which configurations are persisted in key-value stores provisioned in local storage units, according to embodiments.

FIG. 3 is a simplified block diagram of a computing system 300 in which configurations are persisted in key-value stores 360 provisioned in local storage units 350, according to embodiments. Computing system 300 includes a schema engine 310, an image depot 320, a VM management server 330, and a cluster of hosts 340.

In computing system 300, configurations for system services are defined in schemas. Software publishers of system services define the schemas in schema definition files, e.g., VMware Managed Object Design Language 2 (VMODL2) files 302. Each VMODL2 file 302 corresponds to a system service (i.e., system services 1 through n).

Schema engine 310 is a physical or virtual server that processes VMODL2 files 302 and generates schemas from the VMODL2 files. In the embodiments illustrated herein, the schemas are in the format of JavaScript Object Notation (JSON) files 304. For each VMODL2 file 302, schema engine 310 generates an individual JSON file, e.g., SS1.schema.json, referred to herein as a "configuration schema." Additionally, for each VMODL2 file 302 that contains a definition for a default configuration, schema engine 310 generates a default JSON file, e.g., SS1.default.json, referred to herein as a "default schema." A default schema for a system service contains the initial configurations for the system service, and a host 340 may revert to these initial configurations as described in U.S. patent application Ser. No. 16/837,760, filed Apr. 1, 2020, the entire contents of which are incorporated by reference herein. In the example given in FIG. 3, default schemas are available for system services 1 and n, but not for system service 2.

Image depot 320 is a storage service that stores software installation bundles (SIBs) for system services executed on hosts 340, e.g., "SS1 SIB," "SS2 SIB," and "SSn SIB." Each SIB contains the binaries for executing a system service on a host 340. Additionally, each SIB for which a configuration schema has been defined embeds JSON files generated by schema engine 310 in its metadata. For example, SS1 SIB contains the binaries for executing system service 1 and also embeds SS1.schema.json and SS1.default.json in its metadata. Additionally, image depot 320 contains SIBs for system services for which configuration schemas have not been defined (not shown). These are system services, referred to herein as "legacy system services," that were open-sourced or that were created far in the past. As a result, there is no current set of developers that understands the designs of these legacy system services well enough to define configuration schemas for them. These system services are still running in hosts 340 and still rely on legacy files 370 to run properly. Legacy files 370 are described further below.

Hosts 340 are servers that may be constructed on server grade hardware platforms such as x86 architecture platforms. Each host 340 contains a virtualization software layer (not shown) supporting a VM execution space for concurrently instantiating and executing VMs. Hosts 340 run system services for which configuration schemas have been defined based on configurations stored in key-value stores 360, which are persisted in local storage units 350. Hosts 340 also run legacy system services based on configurations stored in configuration files 372, which are also persisted in local storage units 350.

Local storage units 350 are provisioned in shared storage that may comprise, e.g., magnetic disks or flash memory in a storage area network (SAN), and a separate local storage unit 350 is provisioned for each host 340. Each host 340 maintains its own key-value store 360 and legacy files 370 in a local storage unit 350. In addition, each host 340 maintains a separate copy of master schema JSON file 352 and default JSON files 354.

Master schema JSON file 352 is the master configuration schema of all system services running in hosts 340 for which schemas have been defined. Each default JSON file 354 is the default configuration schema for one of such system services and contains the default configuration for that system service.

Each key-value store 360 is a database in which a "key" corresponds to a system service, and a corresponding "value" for the key stores one or more configuration properties and one or more internal states for that system service. The current configuration state of the system services running in each host 340 for which configuration schemas are defined is maintained in key-value store 360 corresponding to that host 340. The configuration properties are further marked as either being user configurations or system configurations. When a configuration property is marked as a system configuration, the configuration property may be ignored when determining if there is "drift" between the desired and current states of the system services for a host.

Drift occurs when the actual configuration state, as persisted in key-value store 360, deviates from the desired configuration state, as defined in a desired configuration JSON file 336 of a local storage unit 334 accessible by VM management server 330. The user defines the desired configuration state in desired configuration JSON file 336 using APIs 306 as discussed below. Because the user defines the desired state in desired configuration JSON file 336, it does not include system configurations. As such, system configurations are ignored when detecting drift to avoid improper remediations from current state to desired state. Remediation and detection of drift are described further below in conjunction with FIG. 12. Additionally, when a host 340 reboots, system configurations are deleted from key-value store 360, while user configurations are persisted across reboots.

Legacy files 370 are files that are required by legacy system services. Each legacy system service relies on a set of legacy files 370, which includes configuration files 372, vital state files 374, and cached state files 376. Configuration files 372 store configurations of the legacy system service. Vital state files 374 store vital states generated by the legacy system service while it is executing. Cached state files 376 store cached states generated by the legacy system service while it is executing. Hosts 340 distinguish between configuration files 372, vital state files 374, and cached state files 376 based on tags of the files, as described below in conjunction with FIG. 6.

VM management server 330 is a physical or virtual server that manages the lifecycle of VMs running in hosts 340. VM management server 330 also manages installation and configuration of system services in hosts 340. During installation of system services, hosts 340 retrieve binaries of the system services from image depot 320 and load them into memory for execution therein, and configuration manager 332 extracts configuration schemas and any default schemas embedded in the metadata of these system services. Configuration manager 332 generates master schema JSON file 352 from the configuration schemas of these system services and stores master schema JSON file 352 in local storage units 350. In addition, configuration manager 332 stores any default schemas in local storage units 350.

Each host 340 contains a host configuration manager 342 for accessing key-value store 360 in response to an "apply" API call received from configuration manager 332. To make the apply API call, configuration manager 332 accesses desired configuration JSON file 336 from local storage unit 334 and transmits desired configuration JSON file 336 to host configuration manager 342 along with the apply API call. In response to the apply API call, host configuration manager 342 checks for drift by comparing the desired configuration state expressed in desired configuration JSON file 336 with the actual configuration state, as persisted in key-value store 360. If there is drift in any of the configuration objects, plug-ins (not shown) in host 340 update key-value store 360 to apply all the configurations that are in drift.

Figure 9A:
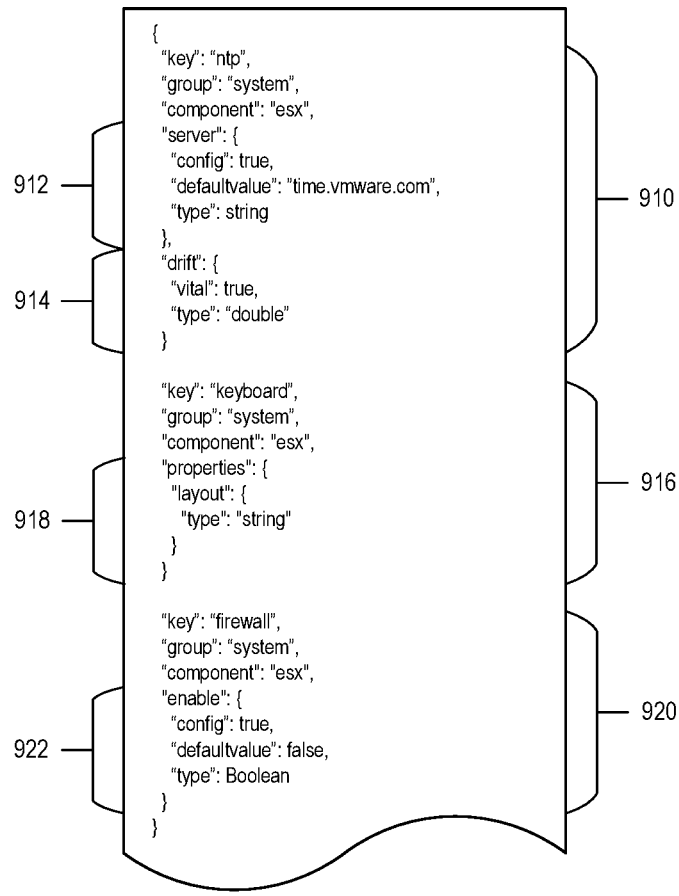
FIG. 9A is an example of a desired configuration JSON file and key-value store.

To configure system services running in hosts 340 for which configuration schemas have been defined, an end user operates a UI (not shown) on VM management server 330 to make configuration API calls 306, which are exposed by configuration manager 332. Configuration API calls 306 include "set," "update," "delete," and "get" API calls. In response, configuration manager 332 updates desired configuration JSON file 336 and makes an apply API call to host configuration managers 342 running in hosts 340 to apply the configurations defined in the updated desired configuration JSON files 336, as illustrated in FIGS. 9B-9D.

Changes to the configurations of legacy system services are not permitted, but a user may directly modify configuration files 372. As a way to monitor such activity, configuration files 372 are designated read-only and any modifications to configuration files 372 are stored in delta disks. Upon reboot or upon application of desired configuration JSON file 336, all such delta disks are deleted to restore the configurations of the legacy system services to the state defined in configuration files 372. This process is further described below in conjunction with FIG. 7.

Figure 9B:
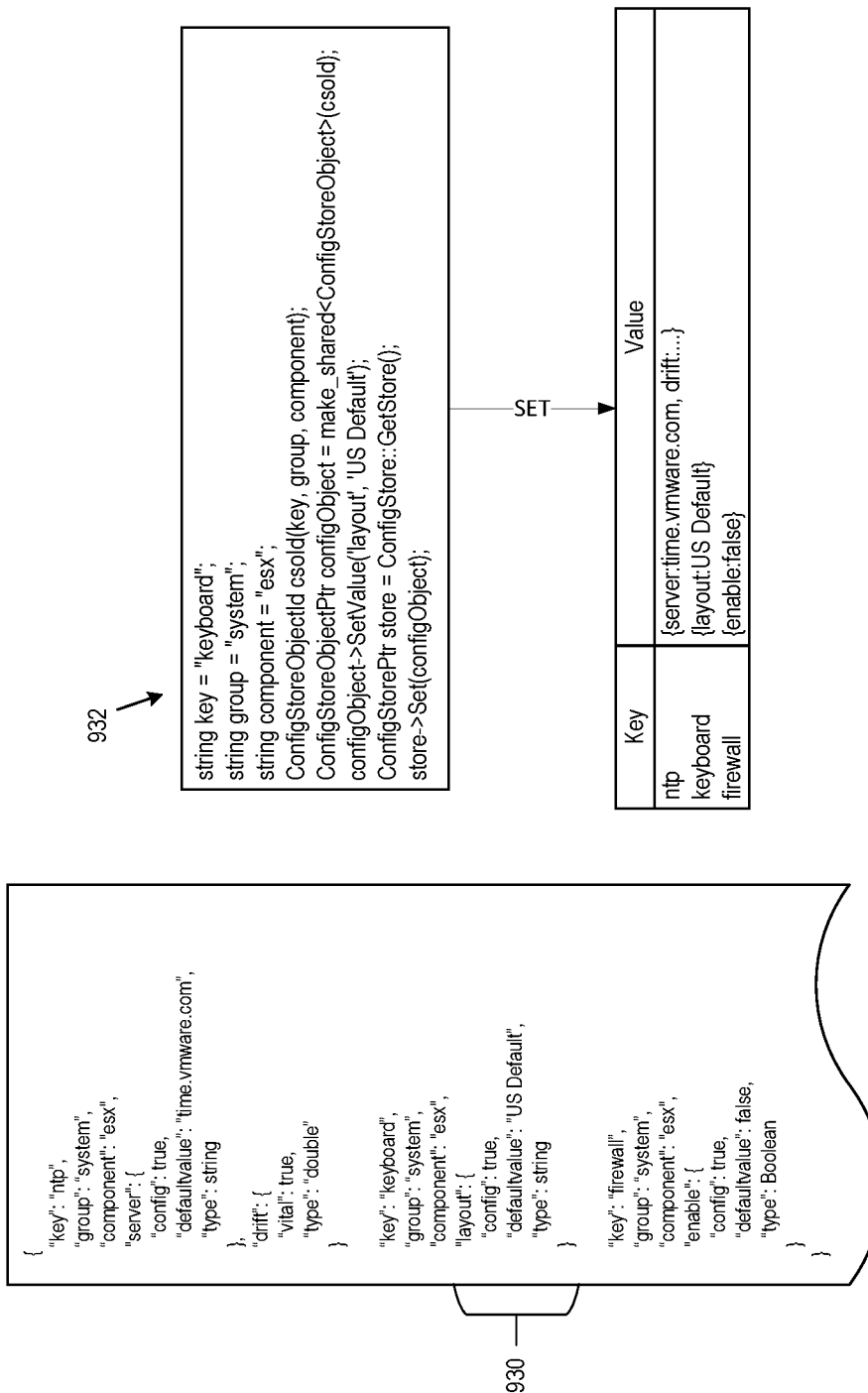
FIG. 9B is an example of a desired configuration JSON file and key-value store after set API commands are executed.
Figure 9C:
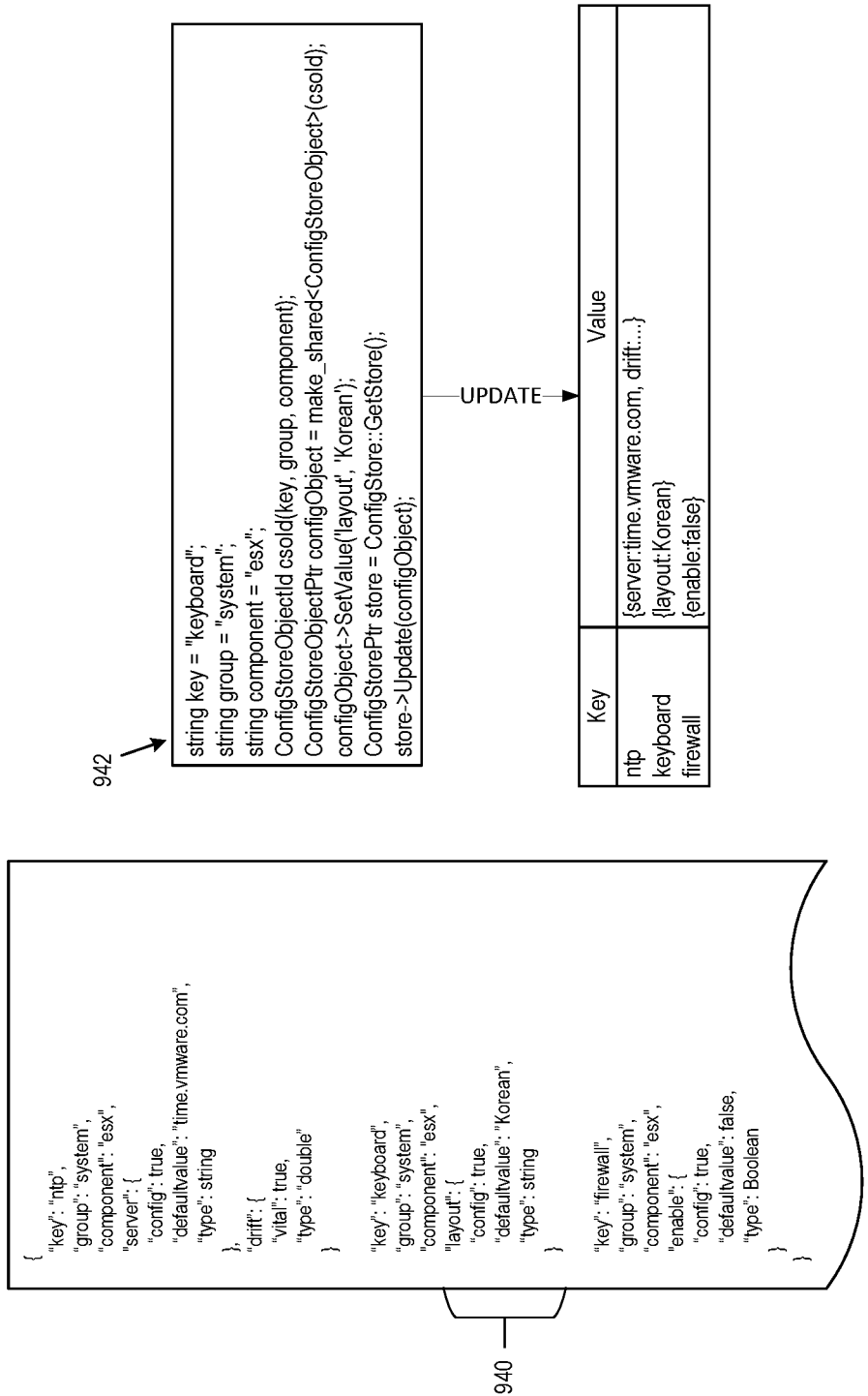
FIG. 9C is an example of a desired configuration JSON file and key-value store after update API commands are executed.
Figure 9D:
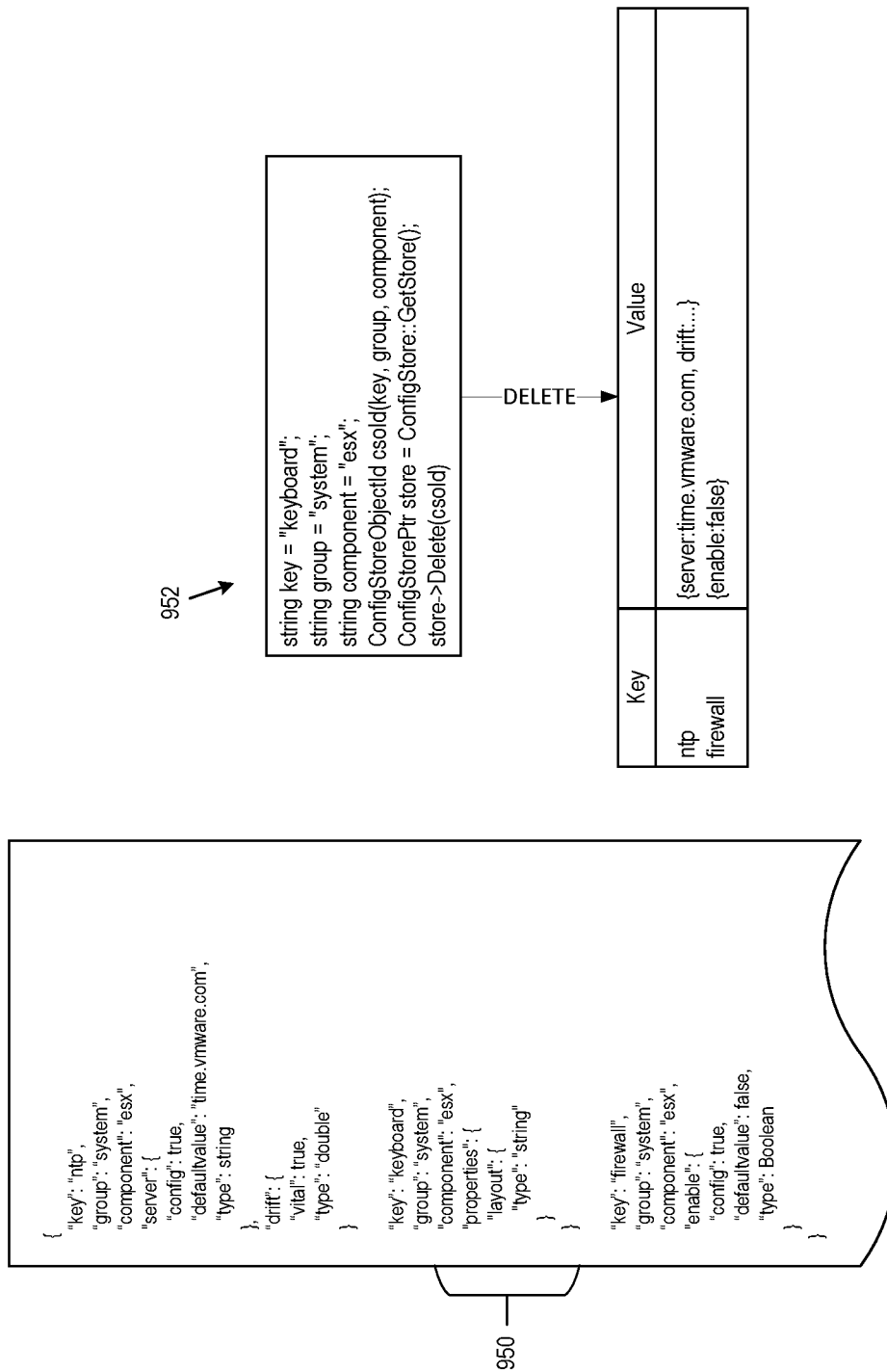
FIG. 9D is an example of a desired configuration JSON file and key-value store after delete API commands are executed.
Figure 9E:
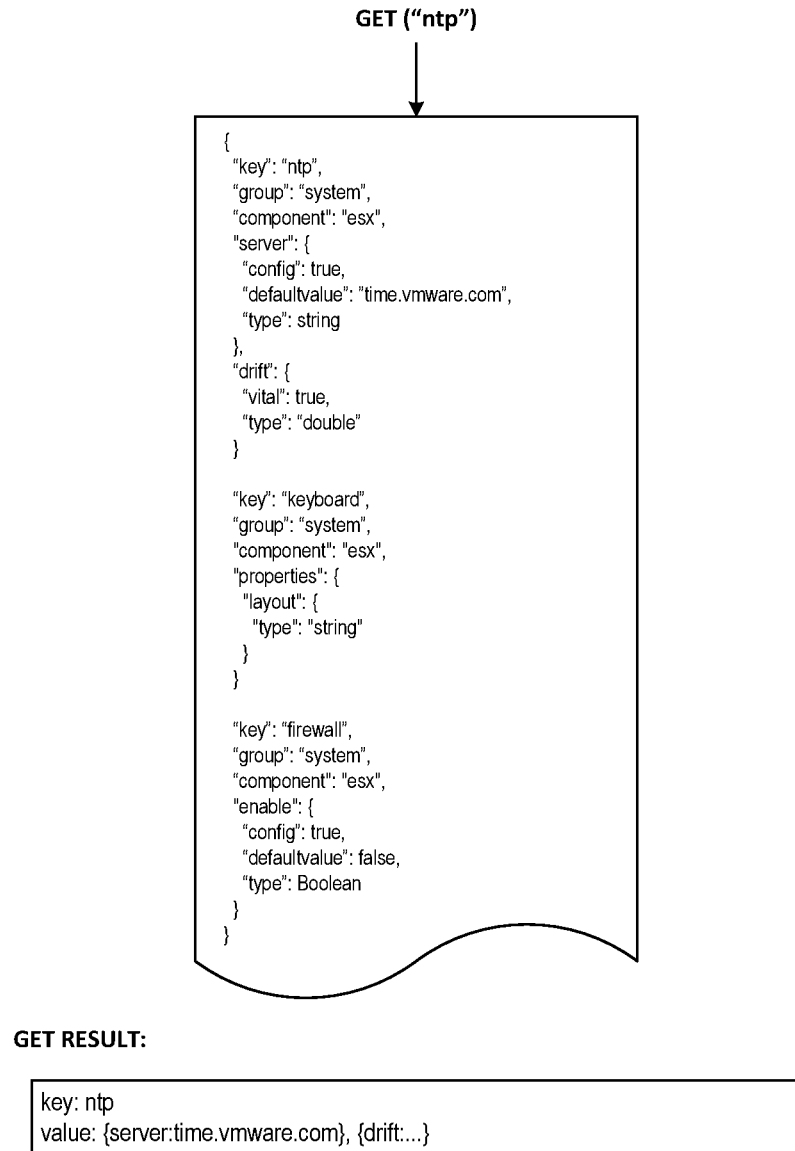
FIG. 9E is an example of a result of a get API command.

A set API call 306 creates or overwrites a configuration object in desired configuration JSON file 336 corresponding to the system service identified in the API call, as illustrated in FIG. 9B. An update API call 306 updates a configuration object in desired configuration JSON file 336 for the system service identified in the API call, as illustrated in FIG. 9C. A delete API call deletes part of a configuration object in desired configuration JSON file 336 for the system service identified in the API call, as illustrated in FIG. 9D. Changes made to desired configuration JSON file 336 pursuant to set, update, and delete API calls result in changes to configuration objects in key-value store 360 via apply API calls. A get API call 306 retrieves a configuration object from desired configuration JSON file 336 for the system service identified in the API call, as illustrated in FIG. 9E.

Figure 4:
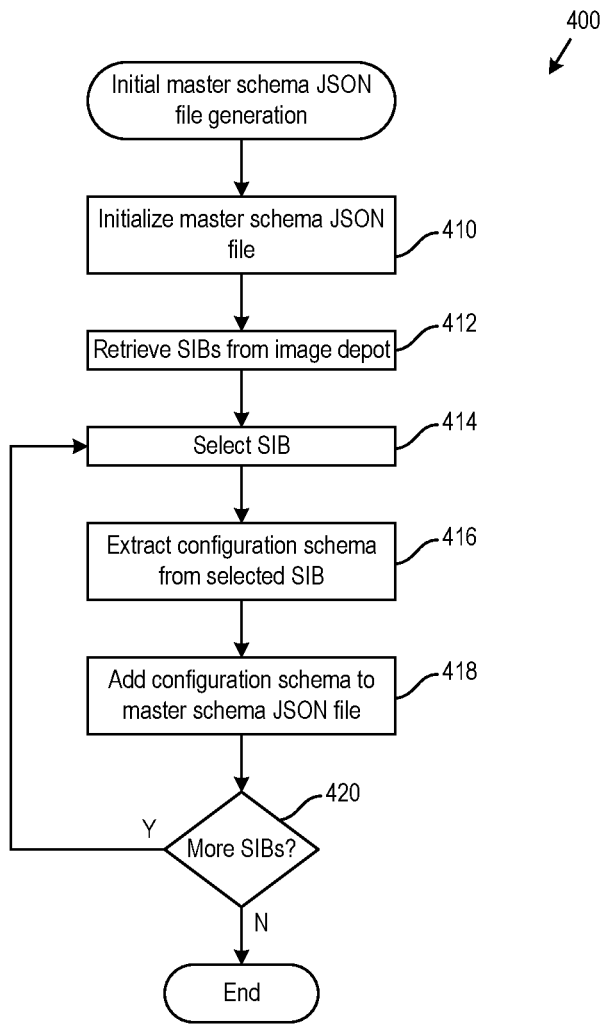
FIG. 4 is a flow diagram of a method carried out by a virtual machine management server to generate a master configuration schema, according to an embodiment.

FIG. 4 is a flow diagram of a method 400 carried out by VM management server 330 to generate a master schema JSON file 352, according to an embodiment.

At step 410, configuration manager 332 initializes a master schema JSON file 352 without any configuration schemas. At step 412, configuration manager 332 retrieves all the SIBs from image depot 320 for which configuration schemas have been defined, each of such SIBs containing a configuration schema for a system service embedded in its metadata.

At step 414, configuration manager 332 selects a SIB, e.g., SS1 SIB. At step 416, configuration manager 332 extracts the configuration schema embedded in the selected SIB, e.g., SS1.schema.json. At step 418, configuration manager 332 adds the extracted configuration schema to the master schema JSON file 352 initialized at step 410.

At step 420, configuration manager 332 determines if there is a SIB for another system service to extract a configuration schema from. If there is, then method 400 moves back to step 414. Otherwise, method 400 ends.

Figure 5:
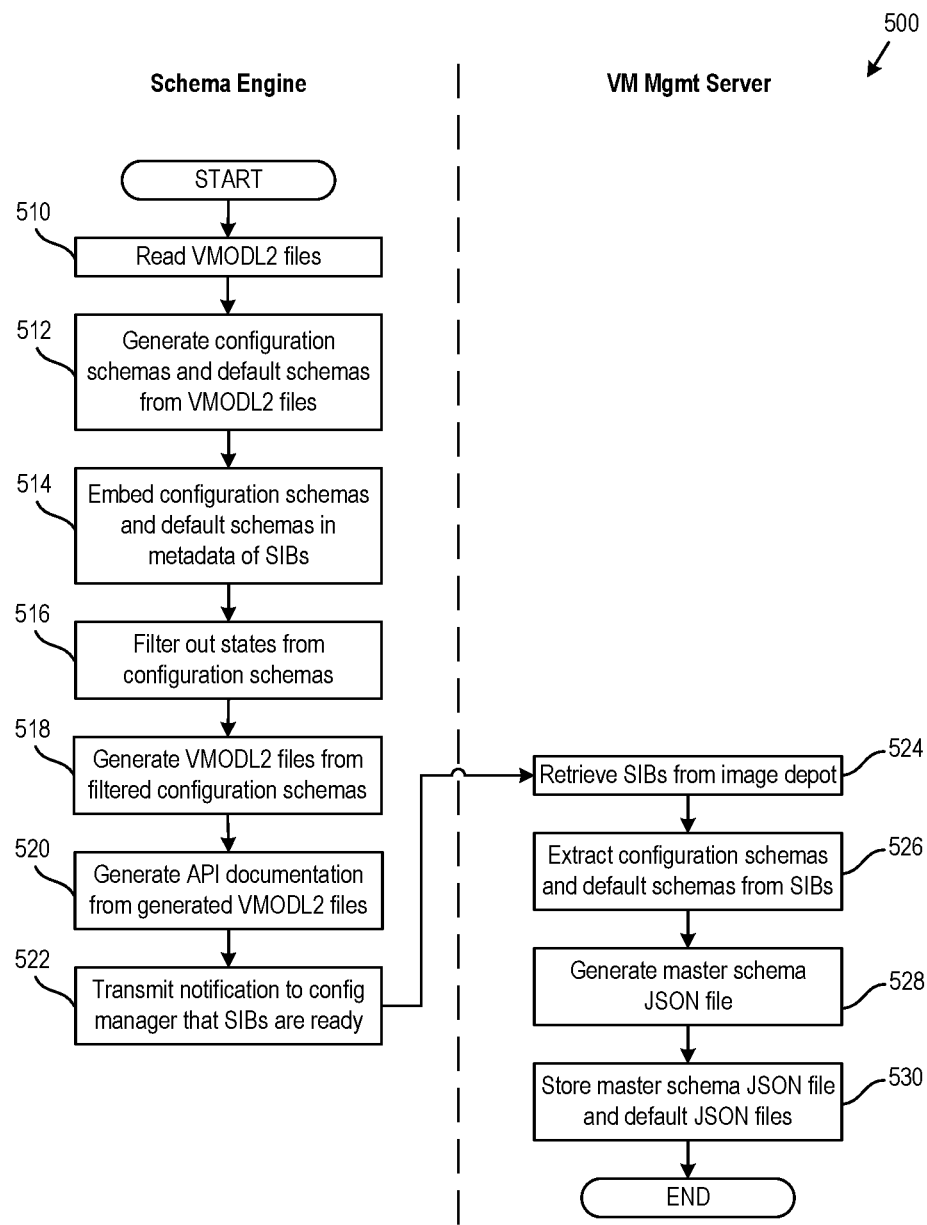
FIG. 5 is a flow diagram of a method carried out by a schema engine and virtual machine management server to embed configuration schemas in metadata of software installation bundles, automatically generate API documentation for APIs that are called to configure system services of a computing system, and generate a master configuration schema, according to an embodiment.

FIG. 5 is a flow diagram of a method 500 carried out by schema engine 310 and VM management server 330 to embed configuration schemas in metadata of SIBs, automatically generate API documentation for APIs that are called to configure system services of computing system 300, and generate master schema JSON file 352, according to an embodiment.

At step 510, schema engine 310 reads VMODL2 files 302 that have been generated by software vendors of the system services. At step 512, schema engine 310 generates configuration schemas and default schemas from VMDOL2 files 302. For example, for the VMODL2 file 302 for system service 1, schema engine 310 generates SS1.schema.json and SS1.default.json.

At step 514, schema engine 310 embeds the configuration schemas and default schemas in the metadata of SIBs of image depot 320. For example, schema engine 310 embeds copies of SS1.schema.json and SS1.default.json in the metadata of SS1 SIB.

At step 516, schema engine 310 filters out internal states defined in separate copies of the configuration schemas, thus leaving only configuration properties for the associated system services. At step 518, schema engine 310 generates a VMODL2 file from each filtered configuration schema. At step 520, schema engine 310 generates API documentation from the generated VMODL2 files. Specifically, schema engine 310 generates API documentation for set, update, delete, and get API calls for each system service for which a schema has been defined.

At step 522, schema engine 310 transmits a notification to configuration manager 332 that the SIBs of image depot 320 are ready for retrieval of the schemas.

At step 524, configuration manager 332 retrieves the SIBs from image depot 320 for which configuration schemas have been defined. At step 526, configuration manager 332 extracts the configuration schemas and default schemas from the retrieved SIBs. At step 528, configuration manager 332 generates master schema JSON file 352 from the configuration schemas extracted at step 526 according to the method of FIG. 4.

At step 530, configuration manager 332 stores master schema JSON file 352 and the default JSON files in local storage units 350. After step 530, method 500 ends.

Figure 6:
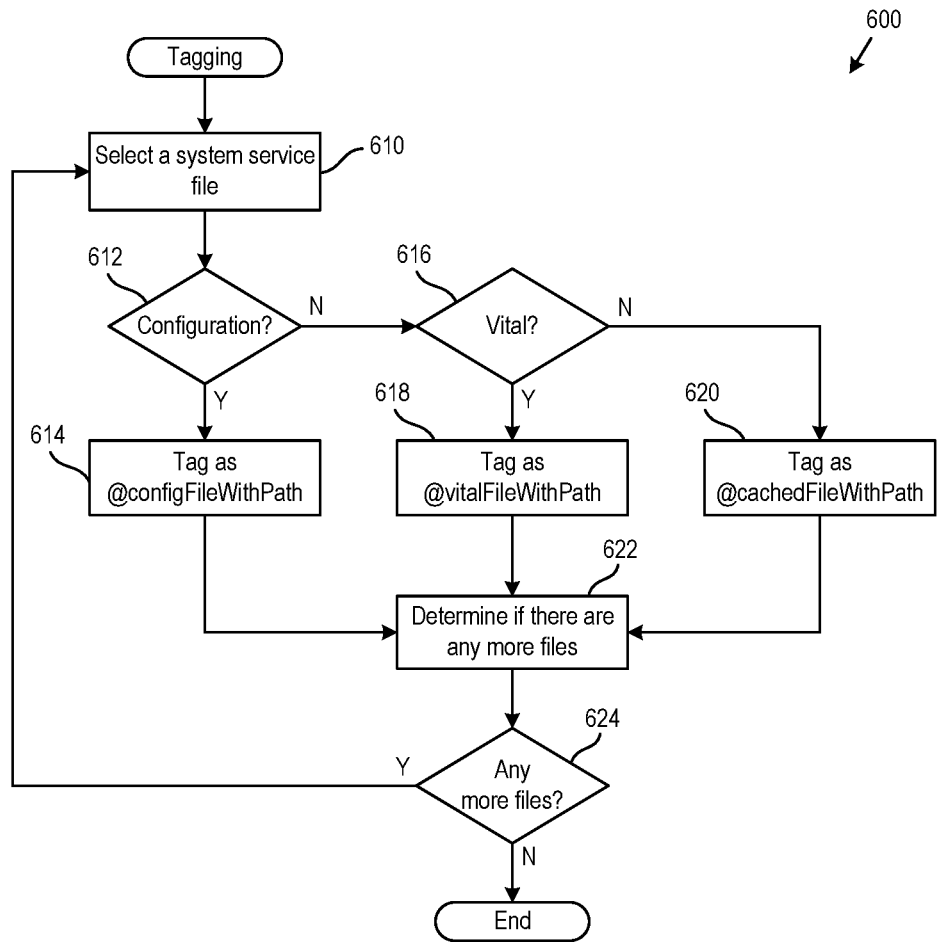
FIG. 6 is a flow diagram of a method carried out by a developer of a system service to classify files of the system service, according to an embodiment.

FIG. 6 is a flow diagram of a method 600 carried out by a developer of a legacy system service to classify files of the system service, according to an embodiment. In the embodiments described herein, the developer tags the files to be of certain types. When a file is tagged in such a manner, its metadata is updated to indicate that the file is of the tagged type.

At step 610, the developer selects a system service file. At step 612, the developer determines if the selected file contains a configuration. If so, the developer at step 614 tags the file as "@configFileWithPath" by adding metadata to the file, indicating that the file is a configuration file 372.

If, at step 612, the selected file does not contain a configuration, then at step 616, the developer determines if the selected file contains vital state. If the selected file contains vital state, then the developer at step 618 tags the selected file as "@vitalFileWithPath," indicating that the file is a vital state file 374. Otherwise, the developer at step 620 tags the selected file as "@cachedFileWithPath," indicating that the file contains cached state and that the file is thus a cached state file 376.

At step 622, the developer determines if there are any more system service files to tag. At step 624, if there are more system service files, method 600 returns to step 610 at which the developer selects another file. Otherwise, method 600 ends.

Figure 7:
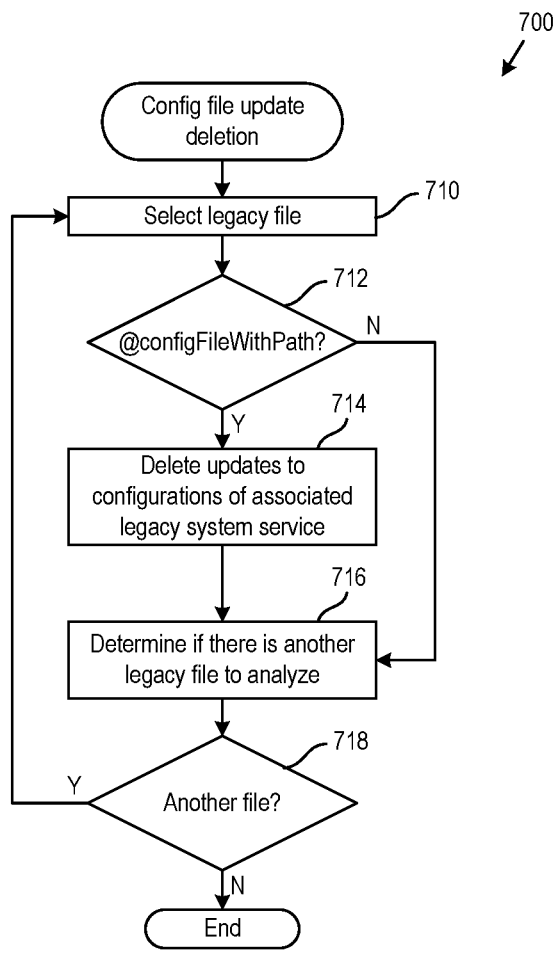
FIG. 7 is a flow diagram of a method carried out by a host to delete updates to configurations of configuration files, according to an embodiment.

FIG. 7 is a flow diagram of a method 700 carried out by a host 340 to delete updates to configurations of legacy system services, according to an embodiment. Method 700 is triggered upon reboot of host 340 or when host 340 processes an apply API call.

At step 710, host configuration manager 342 selects a legacy file 370 from local storage unit 350. At step 712, host configuration manager 342 checks the tag of the selected file. If the tag is @configFileWithPath, indicating that the selected file is a configuration file 372, method 700 moves to step 714. Otherwise, method 700 moves directly to step 716.

At step 714, host configuration manager 342 checks to see if there are any delta disks associated with the selected file, which would indicate that updates have been made to configuration of the legacy system service associated with the selected file. If any such delta disks exist, host configuration manager 342 deletes them so that the configuration of the legacy system service associated with the selected file reverts to the original configuration defined in the selected file.

At step 716, host configuration manager 342 determines if there is another legacy file 370 to analyze from local storage unit 350. At step 718, if there is another file to analyze, method 700 returns to step 710 at which host configuration manager 342 selects another legacy file 370. Otherwise, method 700 ends.

Figure 8:
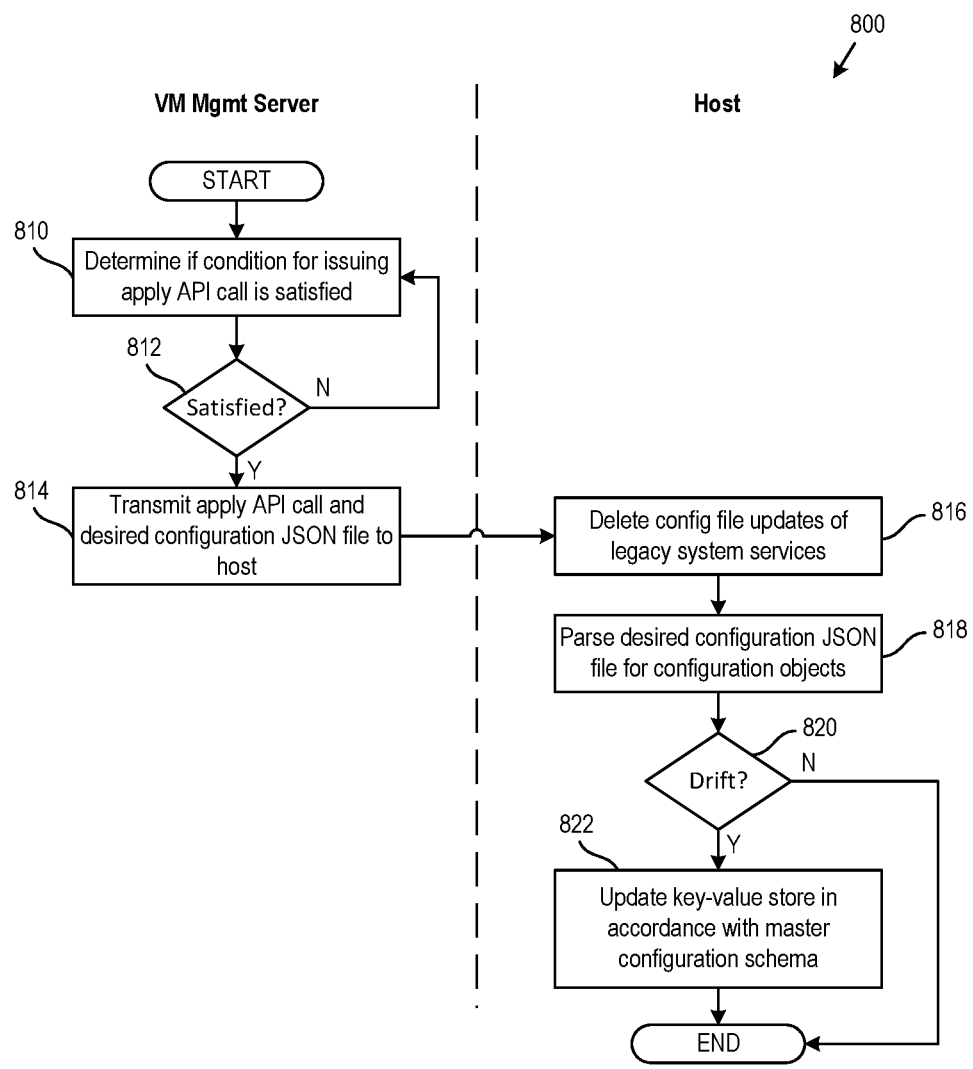
FIG. 8 is a flow diagram of a method carried out by a virtual machine management server and host to persist configurations of a desired configuration JSON file in a key-value store and delete updates to configurations of configuration files, according to an embodiment.

FIG. 8 is a flow diagram of a method 800 carried out by VM management server 330 and a host 340 to persist configurations of desired configuration JSON file 336 in a key-value store 360 and delete updates to configuration files 372, according to an embodiment.

At step 810, configuration manager 332 determines if a condition for issuing an apply API call is satisfied for host 340. The condition for issuing an apply API call may be drift or an update to desired configuration JSON file 336 (e.g., when a user makes one of configuration API calls 306). Configuration manager 332 may periodically transmit a request to a host 340 to check for drift or may transmit a request in response to a user command. Checking for drift is further described below in conjunction with FIG. 12.

At step 812, if the condition is not satisfied, configuration manager 332 returns to step 810 to check again if the condition for issuing an apply API call is satisfied. If the condition is satisfied, configuration manager 332 at step 814 transmits an apply API call to host 340 along with desired configuration JSON file 336.

At step 816, host configuration manager 342 deletes all the updates to configuration files 372 in accordance with FIG. 7. At step 818, host configuration manager 342 parses desired configuration JSON file 336 for configuration objects.

At step 820, host configuration manager 342 determines if any of the configuration objects are in drift, i.e., the actual state does not match the desired state. If not, method 800 ends. If so, host configuration manager 342 at step 822 executes plug-ins associated with the configuration objects in drift to apply the desired state and update the configuration objects in key-value store 360 in accordance with master schema JSON file 352.

If any updates to the configuration objects in key-value store 360 are not in accordance with master schema JSON file 352, host configuration manager 342 returns an error message to configuration manager 332, and method 800 ends.

The updates may include a creation of a key-value entry, an update to an existing key-value entry, or a deletion of an existing key-value entry. To create a key-value entry, a plug-in issues a "set" API command to key-value store 360. To update an existing key-value entry, the plug-in issues an "update" API command to key-value store 360. To delete an existing key-value entry, the plug-in issues a "delete" API command to key-value store 360.

After step 822, method 800 ends, and host 340 runs system services with the updated configurations specified in key-value store 360.

FIG. 9A is an example of desired configuration JSON file 336 and key-value store 360. In the example of FIG. 9A, desired configuration JSON file 336 contains three configuration objects: one for an NTP system service, identified by the key "ntp," one for a keyboard system service, identified by the key "keyboard," and one for a firewall system service, identified by the key "firewall." It should be understood that the example of desired configuration JSON file 336 shown in FIG. 9A is simplified for purposes of illustration and actual examples of desired configuration JSON file 336 contain many more configuration objects.

Lines 910 create the NTP configuration object. As shown in lines 912, the NTP configuration object contains a "server" configuration property, and the value for the server configuration property is "time.vmware.com." Additionally, as shown in lines 914, the NTP configuration object contains a "drift" vital internal state that may be set with a value of type "double."

Lines 916 create the keyboard configuration object. As shown in lines 918, no values have been set for the keyboard configuration object. However, the keyboard configuration object contains a "layout" configuration property that may be set with a value of type "string." Additionally, the keyboard configuration object may contain one or more internal states (not shown).

Lines 920 create the firewall configuration object. As shown in lines 922, the firewall configuration object contains an "enable" configuration property, and the value for the enable configuration property is "false." Additionally, the firewall configuration object may contain one or more internal states (not shown).

Key-value store 360 contains two entries: a first entry for an NTP configuration object and a second entry for a firewall configuration object. The NTP configuration object contains the value "time.vmware.com" for the server configuration property and a value for the drift internal state. The firewall configuration object contains the value "false" for the enable configuration property. Additionally, there is no entry for a keyboard configuration object because no values have been set for the keyboard configuration object in desired configuration JSON file 336.

FIG. 9B is an example of desired configuration JSON file 336 and key-value store 360 after a set API command is executed by configuration manager 332 on the desired configuration JSON file 336 of FIG. 9A. As shown in lines 930, after the set API command is executed on desired configuration JSON file 336, the layout configuration property contains the value "US Default."

After the layout configuration property is set in desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second set API call, represented as lines 932, to update key-value store 360 to contain an entry for a keyboard configuration object. As in desired configuration JSON file 336, the keyboard configuration object contains the value "US Default" for the layout configuration property.

FIG. 9C is an example of desired configuration JSON file 336 and key-value store 360 after an update API command is executed by configuration manager 332 on the desired configuration JSON file 336 of FIG. 9B. As shown in lines 940, after the update API command is executed on desired configuration JSON file 336, the layout configuration property contains the value "Korean."

After the layout configuration property is updated in desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second update API call, represented as lines 942, to update key-value store 360. The layout configuration property in key-value store 360 is then updated from "US Default" to "Korean."

FIG. 9D is an example of desired configuration JSON file 336 and key-value store 360 after a delete API command is executed by configuration manager 332 on the desired configuration JSON file 336 of FIG. 9C. As shown in lines 950, after the delete API command is executed on desired configuration JSON file 336, the layout configuration property no longer contains a value.

After the layout configuration property is deleted from desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second delete API call, represented by lines 952, to key-value store 360. The layout configuration property in key-value store 360 is then deleted along with the keyboard configuration object.

FIG. 9E is an example of a result of a get API command executed on desired configuration JSON file 336 of FIG. 9D. The get API command executed in the example of FIG. 9E retrieves configuration properties and internal states for the NTP system service. The result that is returned in response to the get API command includes the server configuration property with the value time.vmware.com and the drift internal state with the value currently stored for the drift state.

FIG. 10 illustrates an example desired configuration JSON file 336, updates to key-value store 360 that indicate configuration changes made by the user, and updates to key-value store 360 that indicate configuration changes made by host 340 to support the configuration changes made by the user.

In the example given herein, the SSH configuration property "enable" was changed by the user (e.g., by using the update API command) from "false" to "true." As a result, desired configuration JSON file 336 was changed as shown in lines 1010 and 1012. However, the firewall configuration property "enable" was not changed by the user as shown in lines 1014 and 1016.

Before the user configuration change, key-value store 360 contains two entries: a first entry for an SSH configuration object and a second entry for a firewall configuration object. Each entry contains an "enable" configuration property with the value false. To distinguish between user configurations and system configurations, a "type" field is added to each configuration property. The type for each configuration property is "user," indicating a user configuration property specified by desired configuration JSON file 336.

After the user updates the SSH configuration property in desired configuration JSON file 336, configuration manager 332 transmits an apply API call and desired configuration JSON file 336 to host 340. Key-value store 360 is then updated based on the updated desired configuration JSON file 336. Therefore, the configuration property "enable" for SSH is updated to "true." The "type" for the configuration property "enable" for SSH remains "user."

Upon recognizing that SSH system service has been enabled, host 340 automatically enables the firewall system service to support the SSH system service. Accordingly, host 340 updates key-value store 360 to update the configuration property "enable" for firewall to "true." Because it is the host that enabled the firewall system service, the "type" for the configuration property "enable" for firewall is "system."

Figure 11:
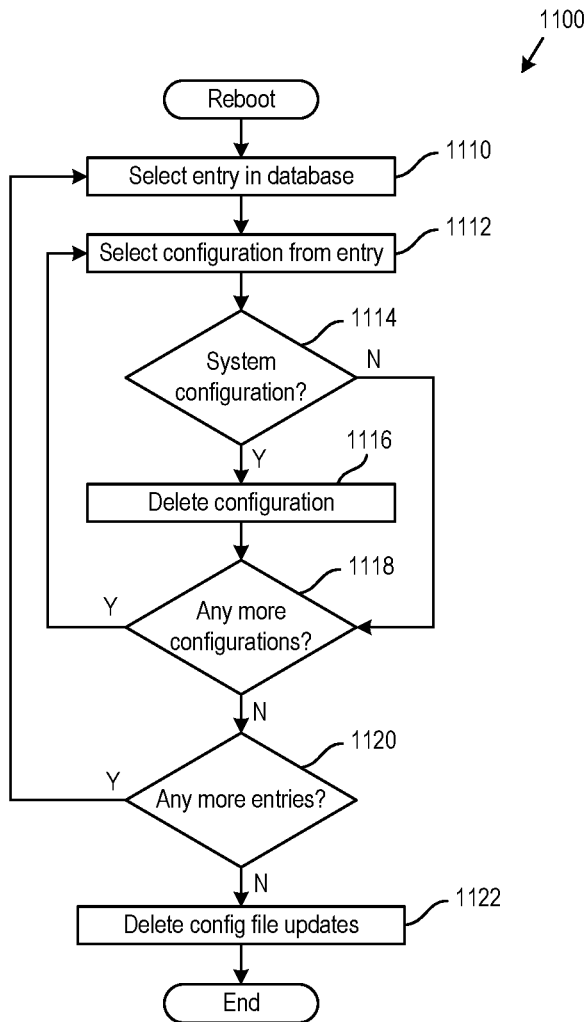
FIG. 11 is a flow diagram of a method of rebooting performed by a host, according to an embodiment.

FIG. 11 is a flow diagram of a method 1100 of rebooting performed by a host 340, according to an embodiment. During this reboot, host 340 restores user configurations which are defined in desired configuration JSON file 336 and does not retain any system configurations or any configuration changes made to configuration files 372.

At step 1110, host configuration manager 342 selects an entry in key-value store 360. At step 1112, host configuration manager 342 selects a configuration from the selected entry. Host configuration manager 342 ignores internal states stored in the selected entry.

At step 1114, host configuration manager 342 determines whether the selected configuration is a system configuration by checking whether the selected configuration is marked as a system configuration. If the selected configuration is a system configuration, host configuration manager 342 at step 1116 deletes the configuration from the selected entry. Otherwise, if the selected configuration is a user configuration, method 1100 moves directly to step 1118 without deleting the configuration.

At step 1118, host configuration manager 342 determines whether there are any more configurations to analyze from the selected entry. If there is another configuration to analyze, method 1100 returns to step 1112 at which host configuration manager 342 selects another configuration. Otherwise, method 1100 moves to step 1120.

At step 1120, host configuration manager 342 determines if there are any more entries to analyze from key-value store 360. If there is another entry to analyze, method 1100 returns to step 1110 at which host configuration manager 342 selects another entry. Otherwise, at step 1122, host configuration manager 342 deletes updates to configuration files 372 according to the method of FIG. 7. After step 1122, method 1100 ends.

Figure 12:
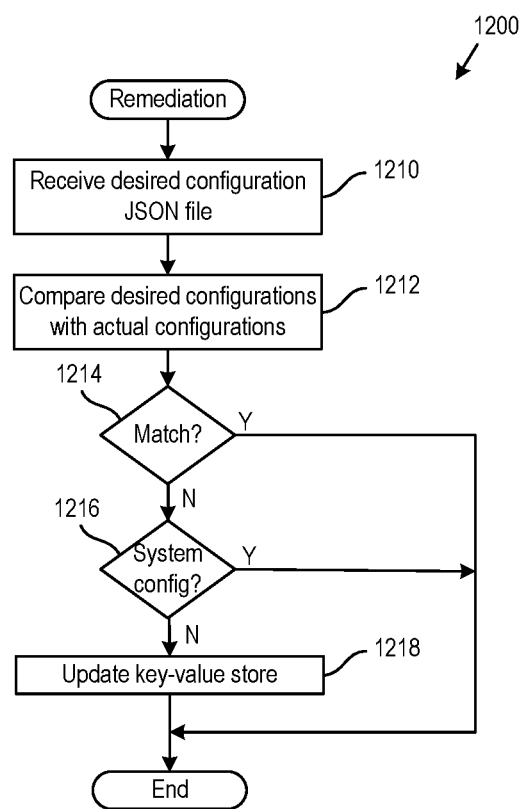
FIG. 12 is a flow diagram of a method of remediating a host from a current state to a desired state based on drift, according to an embodiment.

FIG. 12 is a flow diagram of a method 1200 of remediating a host 340 from a current state, as persisted in key-value store 360, to a desired state, as defined in desired configuration JSON file 336, based on drift, according to an embodiment.

At step 1210, host configuration manager 342 receives desired configuration JSON file 336 from configuration manager 332. At step 1212, host configuration manager 342 parses desired configuration JSON file 336 and compares the desired configurations expressed in desired configuration JSON file 336 with actual configurations stored in key-value store 360. Then, steps 1214-1218 are executed for each configuration property.

At step 1214, host configuration manager 342 determines if the actual configuration state matches the desired configuration state. If there is a match, method 1200 ends.

For each non-matching configuration property, host configuration manager 342 performs a further check at step 1216 to see if the non-matching configuration property is defined as a "system" type in key-value store 360. If the non-matching configuration property is defined as a "system" type in key-value store 360, method 1200 ends. Otherwise, host configuration manager 342 at step 1218 issues a set API call or an update API call to update key-value store 360 to bring the actual configuration state in compliance with the desired configuration state. In cases where a configuration property of a "user" type exists in key-value store 360 but not in desired configuration JSON file 336, host configuration manager 342 issues a delete API call to delete the configuration property from key-value store 360.

In some embodiments, drift is calculated for many configuration properties, and method 1200 is carried out to remediate the actual configuration state to the desired configuration state defined in desired configuration JSON file 336 only when drift is detected for a threshold number of configuration properties.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are hard disk drives (HDDs), solid-state drives (SSDs), network-attached storage (NAS) systems, read-only memory (ROM), random-access memory (RAM), compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest operating system (OS) that perform virtualization functions.

Boundaries between components, operations, and data stores local storage units are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of remediating configurations of a plurality of system services running in each of a plurality of hosts, wherein each of the hosts is configured with a virtualization software for supporting execution of virtual machines therein, said method comprising:
   retrieving actual configurations of the system services, wherein the actual configurations are stored in accordance with a configuration schema of the system services and include a user configuration, which is a configuration initiated by the user, and a system configuration, which is a configuration initiated by the host in response to the user configuration;
   retrieving desired configurations of the system services from a desired configuration file;
   comparing each of the actual configurations with a corresponding one of the desired configurations; and
   upon determining that at least one actual configuration, which is not a system configuration, is different from a corresponding one of the desired configurations, replacing the at least one actual configuration with the corresponding desired configuration.

2. The method of claim 1, wherein
   the actual configurations include first and second actual configurations for a first system service and the desired configurations include first and second desired configurations for the first system service; and
   said at least one actual configuration includes the first actual configuration, and not the second actual configuration, and the corresponding one of the desired configurations is the first desired configuration.

3. The method of claim 2, wherein
   upon a reboot, deleting the second actual configuration, but retaining the first actual configuration.

4. The method of claim 2, wherein the actual configurations and the desired configurations do not include any configurations for a second system service, and the configurations for the second system service are stored in a configuration file.

5. The method of claim 4, further comprising:
   storing updates to the configurations for the second system service in a delta disk.

6. The method of claim 5, wherein the delta disk is deleted upon reboot.

7. The method of claim 5, wherein the delta disk is deleted in response to an update to the actual configurations using the desired configurations.

8. The method of claim 2, wherein the configuration schema of the system services includes a configuration schema for the first system service but not the second system service.

9. The method of claim 8, wherein the actual configurations are stored in a key-value database, and the first system service has a corresponding key in the key-value database but the second system service does not have a corresponding key in the key-value database.

10. A computing system comprising:
    a cluster of hosts each configured with a virtualization software for supporting execution of virtual machines therein, wherein each of the hosts is configured to carry out a method of remediating configurations of a plurality of system services running therein, said method comprising:
    retrieving actual configurations of the system services, wherein the actual configurations are stored in accordance with a configuration schema of the system services and include a user configuration, which is a configuration initiated by the user, and a system configuration, which is a configuration initiated by the host in response to the user configuration;
    retrieving desired configurations of the system services from a desired configuration file;
    comparing each of the actual configurations with a corresponding one of the desired configurations; and
    upon determining that at least one actual configuration, which is not a system configuration, is different from a corresponding one of the desired configurations, replacing the at least one actual configuration with the corresponding desired configuration.

11. The computing system of claim 10, wherein
    the actual configurations include first and second actual configurations for a first system service and the desired configurations include first and second desired configurations for the first system service; and
    said at least one actual configuration includes the first actual configuration, and not the second actual configuration, and the corresponding one of the desired configurations is the first desired configuration.

12. The computing system of claim 11, wherein
    upon a reboot, deleting the second actual configuration, but retaining the first actual configuration.

13. The computing system of claim 11, wherein the actual configurations and the desired configurations do not include any configurations for a second system service, and the configurations for the second system service are stored in a configuration file.

14. The computing system of claim 13, further comprising:

storing updates to the configurations for the second system service in a delta disk.

15. The computing system of claim 14, wherein the delta disk is deleted upon reboot.

16. The computing system of claim 14, wherein the delta disk is deleted in response to an update to the actual configurations using the desired configurations.

17. The computing system of claim 11, wherein the configuration schema of the system services includes a configuration schema for the first system service but not the second system service.

18. The computing system of claim 17, wherein the actual configurations are stored in a key-value database, and the first system service has a corresponding key in the key-value database but the second system service does not have a corresponding key in the key-value database.

19. A non-transitory computer readable medium comprising instructions to be executed in one of a plurality of hosts that are each configured with a virtualization software for supporting execution of virtual machines therein, to carry out a to carry out a method of remediating configurations of a plurality of system services running therein, said method comprising:

retrieving actual configurations of the system services, wherein the actual configurations are stored in accordance with a configuration schema of the system services and include a user configuration, which is a configuration initiated by the user, and a system configuration, which is a configuration initiated by the host in response to the user configuration;

retrieving desired configurations of the system services from a desired configuration file;

comparing each of the actual configurations with a corresponding one of the desired configurations; and upon determining that at least one actual configuration, which is not a system configuration, is different from a corresponding one of the desired configurations, replacing the at least one actual configuration with the corresponding desired configuration.

20. The non-transitory computer readable medium of claim 19, wherein the method further comprises:

storing updates to configurations for a legacy system service, which is one of the system services, in a delta disk; and deleting the delta disk in response to a reboot or in response to an update to the actual configurations using the desired configurations.

* * * * *